ns>

(12) United States Patent
Kulkarni et al.

(10) Patent No.: US 10,402,059 B1
(45) Date of Patent: Sep. 3, 2019

(54) SYSTEM AND METHOD OF SMART FRAMEWORK FOR TROUBLESHOOTING PERFORMANCE ISSUES

(71) Applicant: EMC IP Holding Company LLC, Hopkinton, MA (US)

(72) Inventors: Gururaj Kulkarni, Bangalore (IN); Vladimir Mandic, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 524 days.

(21) Appl. No.: 14/137,754

(22) Filed: Dec. 20, 2013

(51) Int. Cl.
   *G06F 3/0484* (2013.01)
   *G06F 16/245* (2019.01)
   *G06F 11/34* (2006.01)

(52) U.S. Cl.
   CPC ........ *G06F 3/0484* (2013.01); *G06F 11/3409* (2013.01); *G06F 16/245* (2019.01)

(58) Field of Classification Search
   CPC ......... G06F 17/30536; G06F 17/30286; G06F 17/30312; G06F 17/30424; G06F 17/30551; G06F 17/30572; G06F 11/34; G06F 11/3409; G06F 11/3414; G06F 11/3438; G06F 16/245
   See application file for complete search history.

(56) References Cited

U.S. PATENT DOCUMENTS

| | | | | |
|---|---|---|---|---|
| 6,070,190 A * | 5/2000 | Reps | ................... | G06F 11/3495 709/203 |
| 6,393,480 B1 * | 5/2002 | Qin | ..................... | G06F 11/3419 703/19 |
| 6,397,359 B1 * | 5/2002 | Chandra | ............. | H04L 12/2697 709/224 |
| 6,901,442 B1 * | 5/2005 | Schwaller | ........... | H04L 43/0817 709/223 |
| 7,058,727 B2 * | 6/2006 | Dingsor | .................. | H04L 29/06 709/228 |
| 7,072,800 B1 * | 7/2006 | Fernandez | .......... | G06F 11/3414 702/186 |
| 7,412,623 B1 * | 8/2008 | Lindberg | ............. | G06F 11/3414 714/33 |
| 8,175,863 B1 * | 5/2012 | Ostermeyer | ........ | G06F 17/5009 703/13 |
| 2006/0095905 A1 * | 5/2006 | Courchesne | ............ | G06F 9/485 718/100 |
| 2006/0168199 A1 * | 7/2006 | Chagoly | ................ | G06Q 10/10 709/224 |

(Continued)

OTHER PUBLICATIONS

Sun StorEdge Enterprise Backup Software™ 7.2 Administrators Guide. Nov. 2004. Sun Microsystems, Inc., 684 pages.*

(Continued)

*Primary Examiner* — James E Richardson
(74) *Attorney, Agent, or Firm* — Van Pelt, Yi & James LLP

(57) ABSTRACT

A system for displaying a performance dashboard comprises an input interface, a processor, and an output interface. The input interface is configured to receive log data. The log data comprises a set of process log entries. The processor is configured to determine one or more daemon response times and to determine dashboard information. The dashboard information is based at least in part on the log data and the one or more daemon response times. The output interface is configured to provide the dashboard information.

21 Claims, 14 Drawing Sheets

(56) References Cited

U.S. PATENT DOCUMENTS

| | | | | |
|---|---|---|---|---|
| 2007/0294388 | A1* | 12/2007 | Yu | H04L 43/0817 |
| | | | | 709/224 |
| 2008/0263401 | A1* | 10/2008 | Stenzel | G06F 11/3495 |
| | | | | 714/31 |
| 2012/0023226 | A1* | 1/2012 | Petersen | H04W 4/18 |
| | | | | 709/224 |
| 2012/0102007 | A1* | 4/2012 | Ramasubramanian | |
| | | | | G06F 17/30563 |
| | | | | 707/705 |
| 2013/0246404 | A1* | 9/2013 | Annau | G06F 17/30672 |
| | | | | 707/723 |
| 2014/0040306 | A1* | 2/2014 | Gluzman Peregrine | |
| | | | | G06Q 10/0639 |
| | | | | 707/769 |

OTHER PUBLICATIONS

Masud et al. Flow-based Identification of Botnet Traffic by Mining Multiple Log Files. Oct. 2008. First International Conference on Distributed Framework and Applications, 2008. DFmA 2008. pp. 200-206.*

Goel et al. Forensix: A Robust, High-Performance Reconstruction System. Oct. 2003. The 19th Symposium on Operating Systems Principles (SOSP). 8 pages.*

* cited by examiner

Dashboard
  Server 1
    Configuration Information
    Log Data Information
    Daemon Response Time Information
    System Sizing Information
  Server 2

| Configuration Information | |
|---|---|
| Number of Clients: | 500 |
| Number of Unique Clients: | 250 |
| Number of Storage Nodes: | 30 |
| Number of Devices: | 200 |
| Server Paralellism: | 256 |
| Number of Policies | 5 |
| Number of Groups: | 50 |
| Average Client Parallelism: | 4 |
| Number of Pods: | 50 |
| Number of User Notifications: | 10 |

System Sizing Information

Media Database Size: 1000 MB
Number of Volumes: 100    Size: 100 MB
Number of Savesets: 100000 Size: 900 MB
Number of Clients: 100    Size: 20 kB
Client Database Size: 1000000 MB
Clients: 100
Overall Records: 6250
Average CFI size per client: 10000 MB
Jobs Database Size: 10 MB
Number of Save Jobs: 10000
Number of Sessions: 100000000
Resource Database Size: 50 kB

SYSTEM AND METHOD OF SMART FRAMEWORK FOR TROUBLESHOOTING PERFORMANCE ISSUES

BACKGROUND OF THE INVENTION

An enterprise backup software system comprises many backup clients to protect backup data. An enterprise software system additionally comprises many backup server systems to store backup copies of the data in case an older version needs to be accessed. An enterprise software system administrator maintains the enterprise software system and determines the cause of any system problems. Some software systems problems can be very difficult to understand because of the large number of systems interacting with one another.

BRIEF DESCRIPTION OF THE DRAWINGS

Various embodiments of the invention are disclosed in the following detailed description and the accompanying drawings.

FIG. 5A is a diagram illustrating an embodiment of a display of a dashboard user interface for a server system.

DETAILED DESCRIPTION

Figure 1:
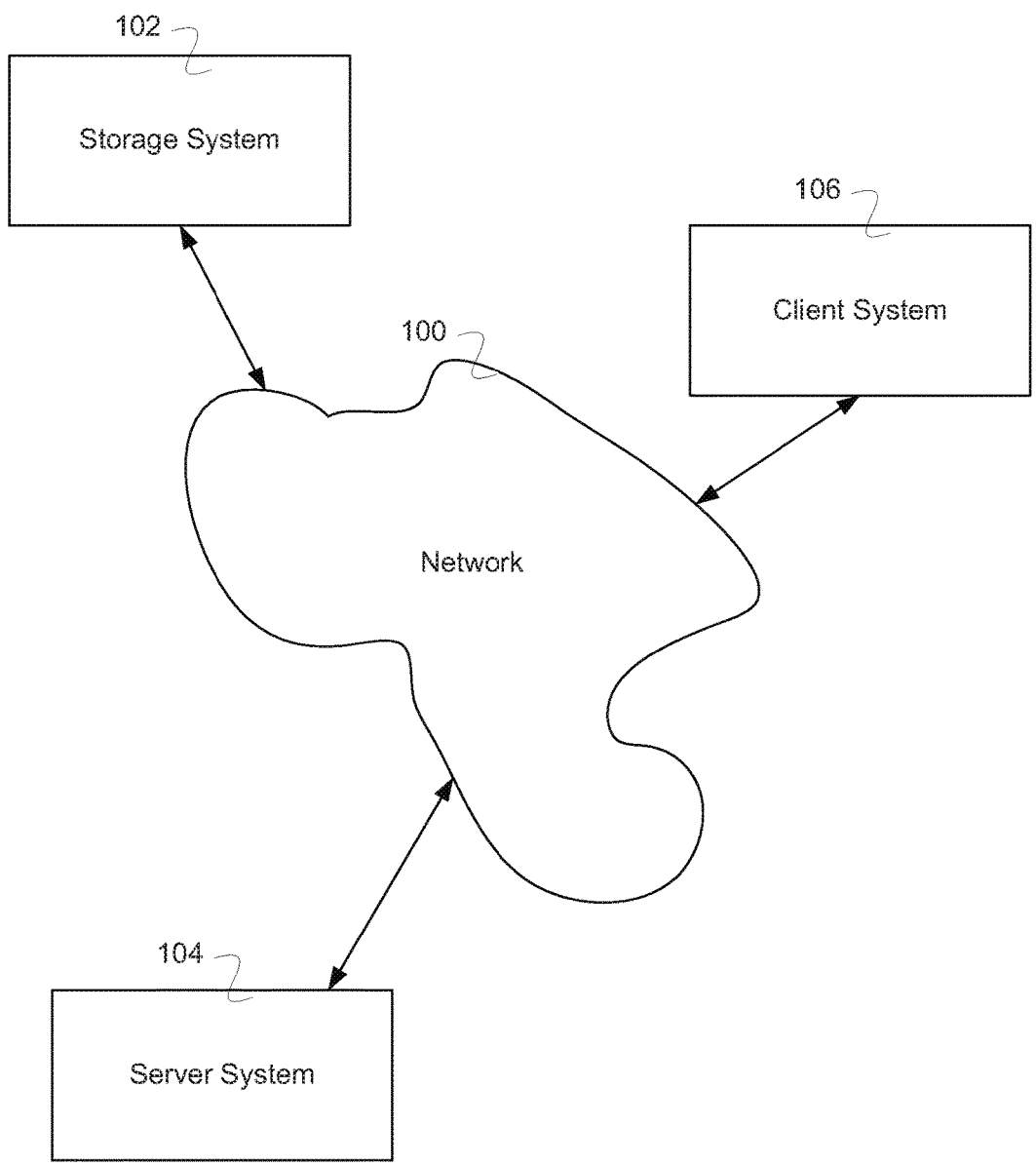
FIG. 1 is a block diagram illustrating an embodiment of a system for a smart framework for troubleshooting performance issues.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system and method of a smart framework for troubleshooting performance issues is disclosed. A system for displaying a performance dashboard comprises an input interface and a processor. The input interface is configured to receive log data. The log data comprises a set of process log entries. The processor is configured to determine one or more daemon response times. The processor is configured to determine dashboard information. The dashboard information is based at least in part on the log data and the one or more daemon response times. The system for displaying a performance dashboard additionally comprises a memory coupled to the processor and configured to provide the processor with instructions.

A system and method of a smart framework for troubleshooting performance issues comprises a system for presenting a system dashboard to a system administrator. In some embodiments, the system administrator comprises an administrator accessing a backup server system as part of an enterprise software system. The system dashboard provides a system summary to the system administrator in order to facilitate determination of the cause of system problems. The system summary details a range of system information for the system administrator. In some embodiments, the system information includes system information (e.g., processor speed, memory, operating system, etc.) and software information (e.g., software versions, driver versions, etc.) for each client system and each storage system. In some embodiments, the system of a smart framework for troubleshooting performance issues comprises a system for gathering system information and software information from a client system or a storage system upon system startup. For example, for each client or storage system that is listed (e.g., in a database of administered or connected clients or storage systems) as being administered or connected to a server that includes the system dashboard, the server that includes the system dashboard retrieves a system information log and then provides the dashboard display information regarding the system information for administered or connected clients or storage systems. In some embodiments, the system information includes process log information (e.g., information describing processes executed). In some embodiments, the system of a smart framework for troubleshooting performance issues comprises a system for logging processes in such a way that system information comprising process log information can be easily displayed to a system administrator.

In some embodiments, the system information includes daemon response time information. In some embodiments, the system of a smart framework for troubleshooting performance issues comprises a system for determining real-time daemon response times. Daemon response times can be indicative of the load or how busy a daemon process is. For example, a server that includes the system dashboard queries active processes (e.g., daemons) to measure their ability to respond to inquiries. In the event that the processes are more occupied, loaded with tasks, or multitasking, a response request will be responded to with a longer delay.

FIG. 1 is a block diagram illustrating an embodiment of a system for a smart framework for troubleshooting performance issues. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, client system 106 comprises a client system (e.g., a computing system for operation by a user). In some embodiments, client system 106 comprises a system accessed by a user directly (e.g., the user is in proximity with client system 106). In some embodiments, client system 106 comprises a system accessed by a user remotely (e.g., the user is not in proximity with client system 106, and accesses client system 106 via network 100 and a separate user system). Client system 106 comprises a system running enterprise software (e.g., business software for creating data, storing data, transmitting data, receiving data, etc.). In some embodiments, client system 106 comprises a system for storing data on a backup system or retrieving stored data from a backup system. In various embodiments, there are 1, 4, 17, 22, 1459, or any other appropriate number of client systems communicating with network 100. Storage system 102 comprises a computer storage system for storing data—for example, backup data. In some embodiments, storage system 102 backs up data stored on client system 106. In various embodiments, storage system 102 performs full backups of the data on client system 106 (e.g., makes complete copies of the data), performs incremental backups of the data on client system 106 (e.g., makes copies of data modified since the last backup), performs a combination of full and incremental backups of the data on client system 106, or performs any other appropriate kind of backup. In some embodiments, data stored on storage system 102 comprises deduplicated backup data (e.g., data is stored in such a way that multiple copies of the same data are only stored a single time). In some embodiments, deduplicated backup data is segmented (e.g., broken into chunks which can then be compared to determine duplicate data). In some embodiments, deduplicated backup data is segmented using a hash function (e.g., a hash function is used to determine where to divide data into segments). In various embodiments, there are 1, 2, 7, 12, 45, 138, or any other appropriate number of backup storage systems communicating with network 100. Server system 104 comprises a server system for interacting with storage system 102 and client system 106. In various embodiments, server system 104 issues commands to storage system 102 and client system 106, reads status information from storage system 102 and client system 106, determines response times of storage system 102 and client system 106, or performs any other backup server system action. In some embodiments, server system 104 is operated by a system administrator (e.g., an administrator maintaining the network backup system). In some embodiments, server system 104 is accessed by a system administrator using an external management console communicating with server system 104 via network 100. In some embodiments, a system administrator using an external management console can access multiple server systems on multiple networked systems.

Figure 2:
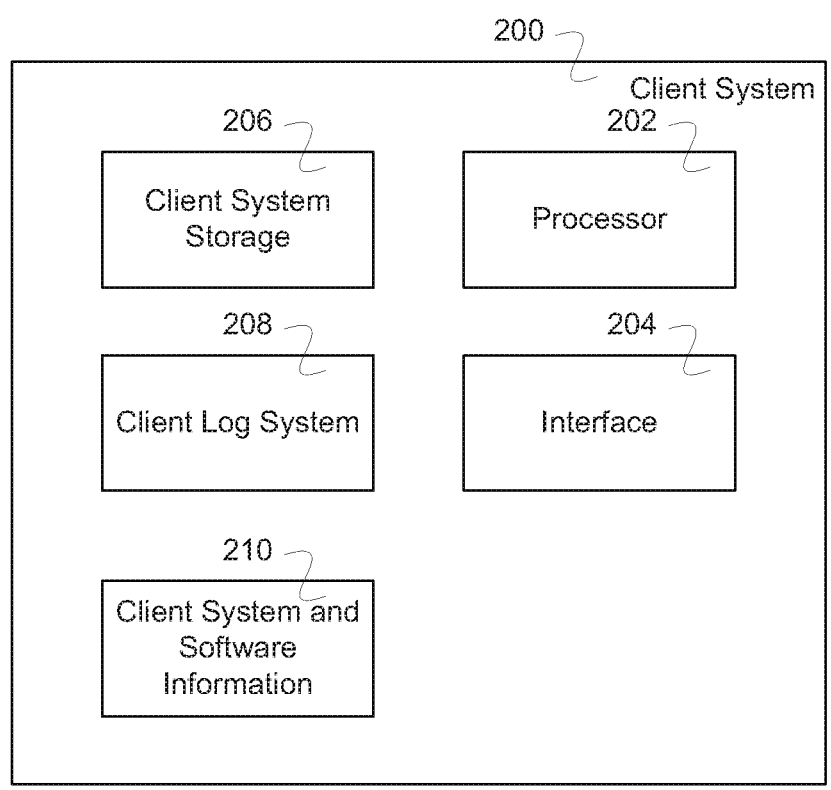
FIG. 2 is a block diagram illustrating an embodiment of a client system.

FIG. 2 is a block diagram illustrating an embodiment of a client system. In some embodiments, client system 200 comprises client system 106 of FIG. 1. In the example shown, client system 200 comprises a system running enterprise software (e.g., business software for creating data, storing data, transmitting data, receiving data, etc.) using processor 202. Client system 200 communicates via a network using interface 204 with server systems, storage systems, and/or other client systems. Client system 200 stores data using client system storage 206. Client log system 208 comprises a system for storing logged data regarding processes and/or operations running on client system 200. In some embodiments, client log system 208 comprises software running on processor 202. Client system and software information 210 stores system information (e.g., hardware facilities—processor speed, memory size, hard drive size, network facilities, etc.) and software information (e.g., operating system and application information—version number(s), available resources, installed programs, interfaces, etc.). Client system and software information 210 is able to be retrieved by a connected system via interface 204 (e.g., using a network to communicate with a connected system).

Figure 3:
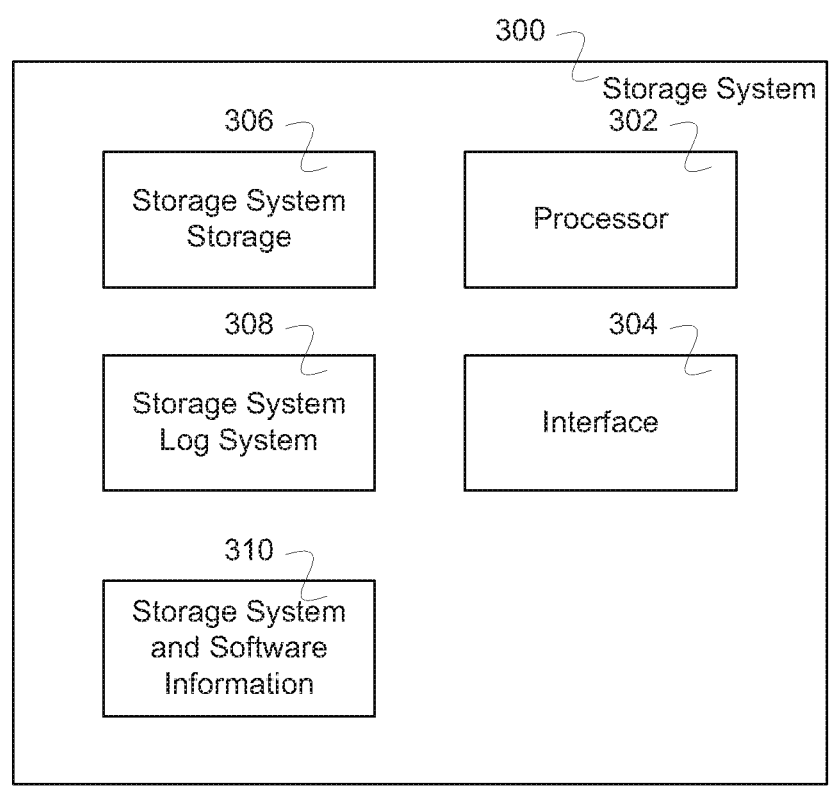
FIG. 3 is a block diagram illustrating an embodiment of a storage system.

FIG. 3 is a block diagram illustrating an embodiment of a storage system. In some embodiments, storage system 300 comprises storage system 102 of FIG. 1. In the example shown, storage system 300 comprises a system running storage software (e.g., backup software for backing up data created on a client system running enterprise software) using processor 302. Storage system 300 communicates with a network using interface 304 and stores data (e.g., backup data) using storage system storage 306. Storage system log system 308 comprises a system for storing logged data regarding processes and/or operations running on storage system 300. In some embodiments, storage system log system 308 comprises software running on processor 302. Storage system and software information 310 stores system information (e.g., hardware facilities—processor speed, memory size, hard drive size, network facilities, etc.) and software information (e.g., operating system and application information—version number(s), available resources, installed programs, interfaces, etc.). Storage system and software information 310 is able to be retrieved by a connected system via interface 304 (e.g., using a network to communicate with a connected system).

Figure 4:
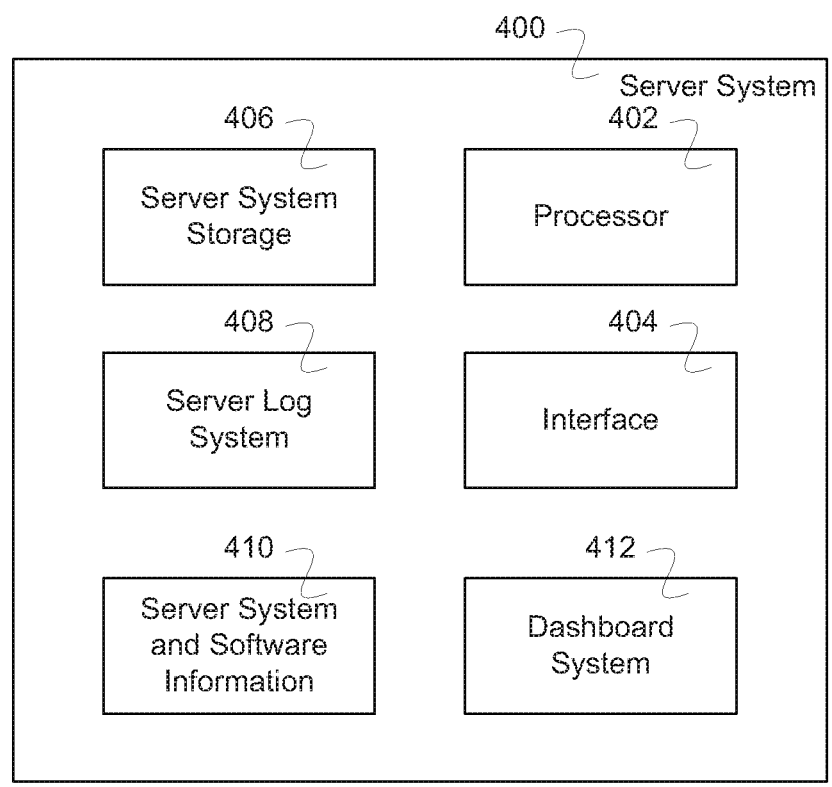
FIG. 4 is a block diagram illustrating an embodiment of a server system.

FIG. 4 is a block diagram illustrating an embodiment of a server system. In some embodiments, server system 400 comprises server system 104 of FIG. 1. In the example shown, server system 400 comprises a dashboard system software (e.g., retrieving information from other server, storage, and/or client systems and providing a display of information for to aid in the diagnosing of issues for the system, etc.) using processor 402. Server system 400 communicates with a network using interface 404 and stores data using server system storage 406. In some embodiments, server system storage 406 comprises server system databases. In various embodiments, server system databases comprise a server system configuration database, a server system media database, a server system index database, a server system jobs database, or any other appropriate databases. Server log system 408 comprise log files comprising a set of process log entries. In some embodiments, process log entries describe processes executed by processor 402 including start times and stop times. In some embodiments, server log system 408 comprise data files stored on server system storage 406. Server system and software information 410 stores system information (e.g., hardware facilities—processor speed, memory size, hard drive size, network facilities, etc.) and software information (e.g., operating system and application information—version number(s), available resources, installed programs, interfaces, etc.). Storage system and software information 410 is able to be displayed in raw or summary form for a user or administrator via interface 404 (e.g., using a network to communicate with a connected system).

FIG. 5A is a diagram illustrating an embodiment of a display of a dashboard user interface for a server system. In some embodiments, dashboard 500 is accessed by a system administrator accessing a server system. In some embodiments, the system administrator accesses multiple server systems via a single maintenance console connected to a network. In the example shown, the system administrator has selected to view information describing a first server (e.g., "Server 1" as opposed to "Server 2") by selecting the Server 1 text. A menu of information options is displayed (e.g., "Configuration Information", "Log Data Information", "Daemon Response Time Information", "System Sizing Information"). The system administrator has selected to view information describing configuration information and system sizing information. For example, the display of configuration information includes: number of clients (e.g., clients configured for server 1 with unique and instances for same clients), number of unique clients (e.g., unique clients configured for server 1), number of storage nodes (e.g., storage nodes configured for server 1), number of devices (e.g., devices configured for server 1—for example, a tape device, a disk storage device, a data domain storage device, etc.), server parallelism (e.g., the server parallelism controls the maximum number of streams that can concurrently run at a given time), number of backup policies (e.g., the policies help to protect a set of clients where a user creates one policy and applies the policy to a group of clients), number of groups (e.g., the groups help to protect a set of clients where a user creates one group and applies the group to a set of individual clients), average client parallelism (e.g., client parallelism controls the maximum number of concurrent streams that a client can send to a server), number of pools (e.g., a pool helps to segregate the backups based on their type such as HR data base backup, finance team backup etc.), number of user notifications (e.g., the user notifications help a backup administrator to notify occurrences of events on backup server), or any other appropriate information. For another example, the display of system sizing information includes: media database size, number of volumes, number of savesets, number of clients, client database size, clients, overall records, average client file index (CFI) size per client, jobs database size, number of save jobs, number of sessions, resource database size, or any other appropriate sizing information.

Figure 5B:
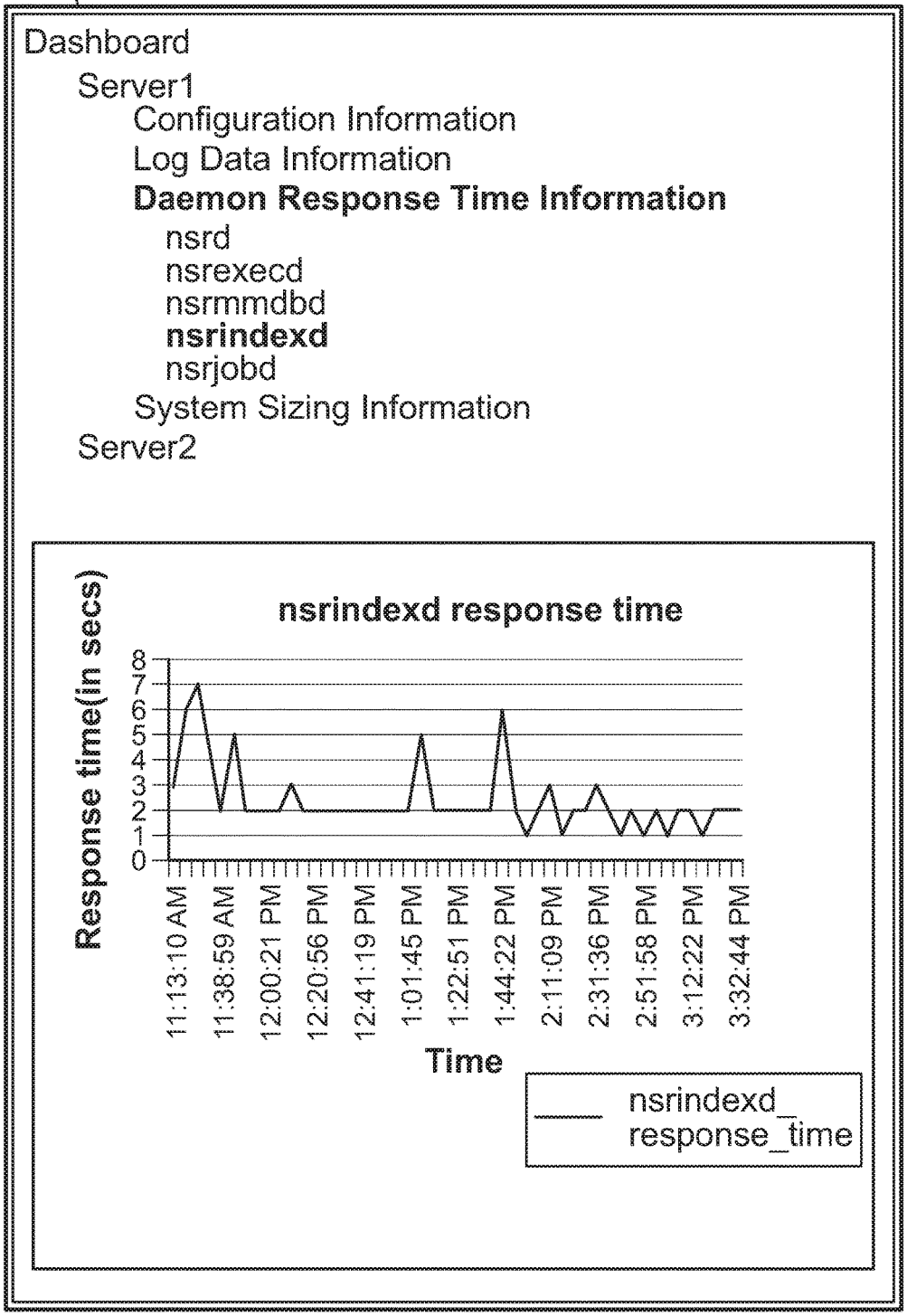
FIG. 5B is a diagram illustrating an embodiment of a display of a dashboard user interface for a server system.

FIG. 5B is a diagram illustrating an embodiment of a display of a dashboard user interface for a server system. In some embodiments, dashboard 520 comprises dashboard 500 of FIG. 5. In the example shown, a system administrator has selected to view information describing daemon response time for a first server. A menu of daemon options is displayed (e.g., "nsrd" (a NetWorker server process that is the master service that controls other services on the NetWorker server, clients, and storage nodes), "nsrexecd" (NetWorker client process that authenticates and processes the NetWorker server remote execution requests and executes the save and savefs programs on the client), "nsrmmdbd" (NetWorker server process that provides media database management services to the local nsrd and nsrmmd services and records entries in the media database), "nsrindexd" (NetWorker server process that provides client file index management services to local nsrd and client's save and recover programs), "nsrjobd" (NetWorker server process that spawns and monitors NetWorker jobs during a backup or recovery operation), etc.). In the example shown, the system administrator has selected to view information describing nsrindexd. A graph of nsrindexd response time as a function of time is shown. The response time comprises a time that it takes to run a query to a daemon.

Figure 5C:
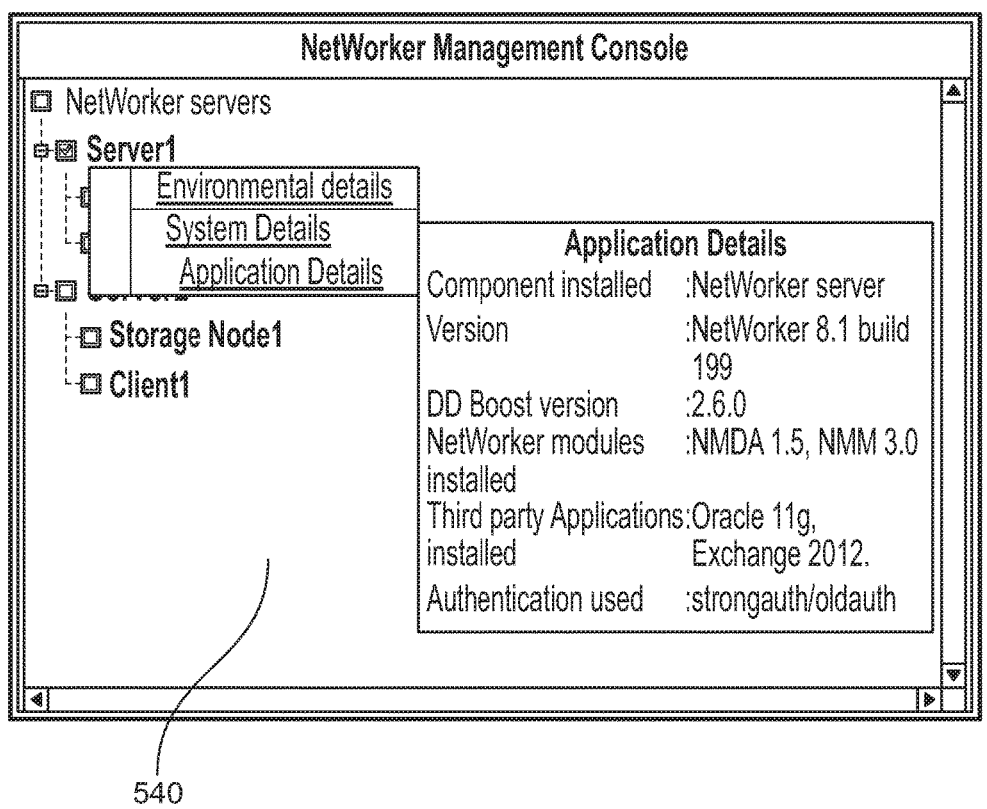
FIG. 5C is a diagram illustrating an embodiment of a display of a dashboard user interface for a server system.

FIG. 5C is a diagram illustrating an embodiment of a display of a dashboard user interface for a server system. In some embodiments, dashboard 540 comprises dashboard 500 of FIG. 5. In the example shown, a networker management console enables selection of server 1, environmental details, system details, and application details. For example, application details include: component installed (e.g., networker server), version (e.g., networker 8.1 build 199), DD Boost version (e.g., NMDA 1.5, NMM 3.0), third party applications installed (e.g., Oracle 11g, Exchange 2012, etc.), authentication used (e.g., strongauth/oldauth), or any other appropriate application detail.

Figure 5D:
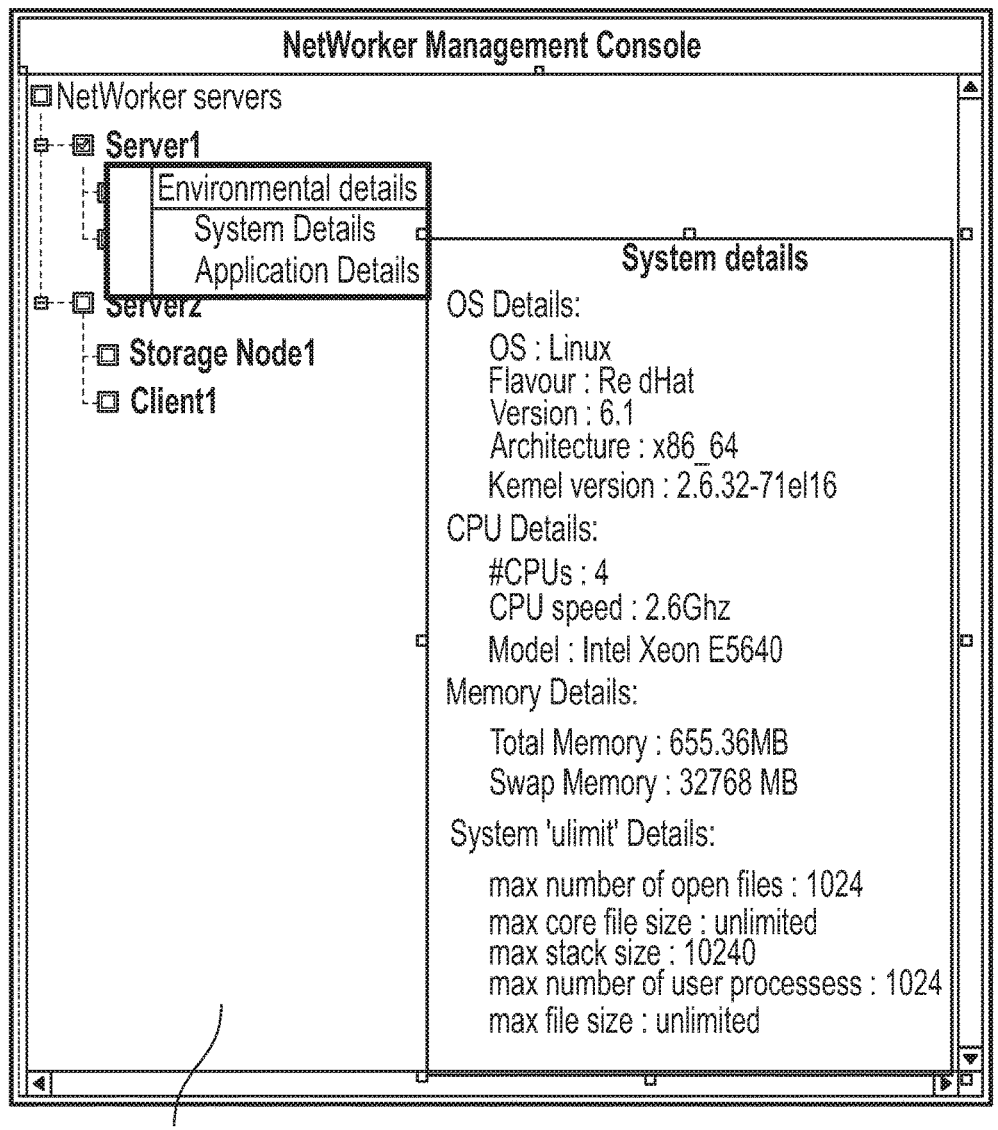
FIG. 5D is a diagram illustrating an embodiment of a display of a dashboard user interface for a server system.

FIG. 5D is a diagram illustrating an embodiment of a display of a dashboard user interface for a server system. In some embodiments, dashboard 560 comprises dashboard 500 of FIG. 5. In the example shown, a networker management console enables selection of server 1, environmental details, system details, and application details. For example, system details include: OS details (e.g., OS: Linux, Flavor: RedHat, Version: 6.1, Archtecture: x86_64, Kernel version: 2.6.32-71.e116), CPU details (e.g., #CPUs: 4, CPU speed: 2.6 GHz, Model: Intel Xenon E5640), Memory Details (e.g., total memory: 65536 MB, swap memory: 32768 MB), System 'ulimit' Details (e.g., max number of open files: 1024, max core filesize: unlimited, max stacksize: 10240, max number of user processes: 1024, max file size: unlimited), or any other appropriate system detail.

Figure 6:
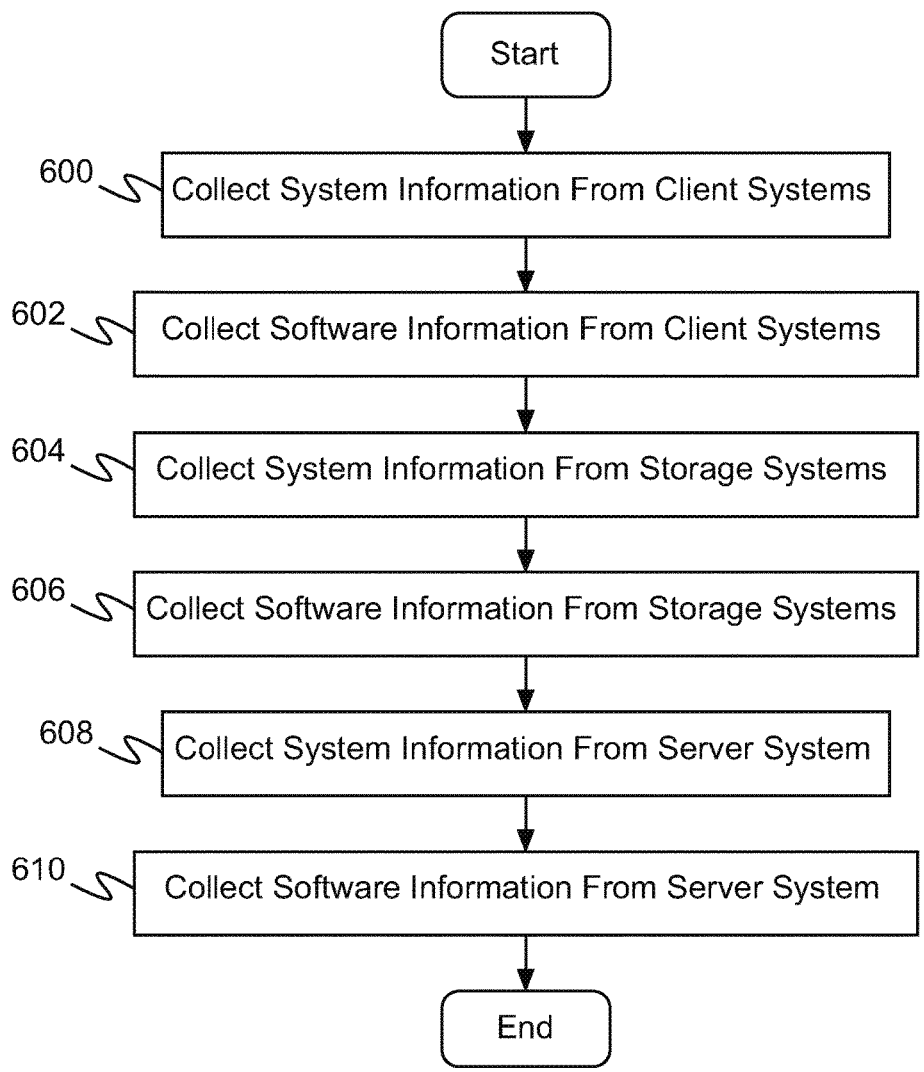
FIG. 6 is a flow diagram illustrating an embodiment of a process for collecting information.

FIG. 6 is a flow diagram illustrating an embodiment of a process for collecting information. In some embodiments, the process of FIG. 6 is executed while a server system (e.g., server system 104 of FIG. 1) is starting up. In 600, system information is collected from client systems (e.g., all client systems accessible via a network). In some embodiments, system information is determined by each client system while it is starting up and prepared for delivery to a backup server system. In various embodiments, system information comprises an operating system type, a CPU architecture, a CPU speed, a number of CPUs, an amount of memory, a filesystem time, a NIC type (e.g., a 10GiG or 1Gig interface) or any other appropriate system information. In 602, software information is collected from client systems (e.g., all client systems accessible via a network). In some embodiments, software information is determined by each client system while it is starting up and prepared for delivery to a server system. In various embodiments, software information comprises a system type, a system software version, a backup software version, a module version, an application name, an authentication type, or any other appropriate software information. In 604, system information is collected from storage systems (e.g., all storage systems accessible via a network). In some embodiments, software information is determined by each storage system while it is starting up and prepared for delivery to a server system. In 606, software information is collected from storage systems (e.g., all storage systems accessible via a network). In some embodiments, software information is determined by each storage system while it is starting up and prepared for delivery to a backup server system. In 608, system information is collected from the server system. In 610, software information is collected from the server system.

Figure 7:
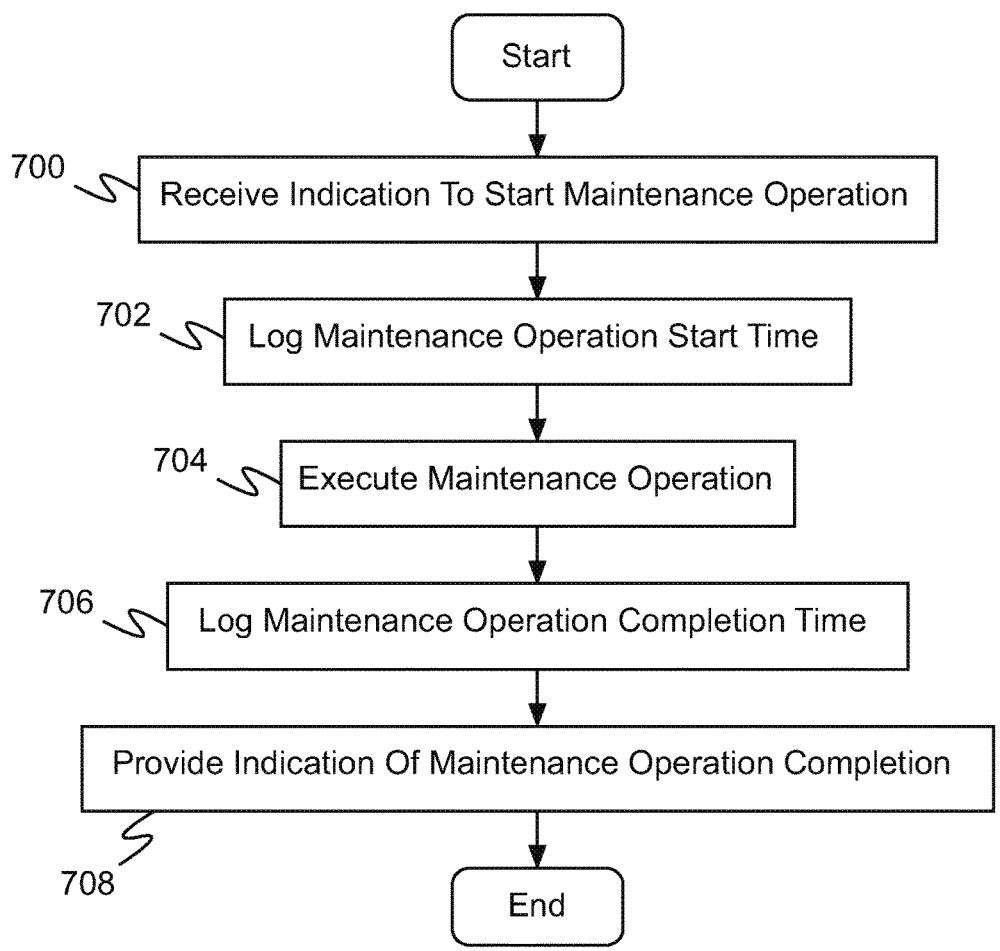
FIG. 7 is a flow diagram illustrating an embodiment of a process for executing and logging a maintenance operation.

FIG. 7 is a flow diagram illustrating an embodiment of a process for executing and logging a maintenance operation. In some embodiments, the process of FIG. 7 is executed by a server system (e.g., server system 104 of FIG. 1). In the example shown, in 700, an indication to start a maintenance operation is received. In various embodiments, an indication to start a maintenance operation is received from a client system, from a storage system, from a process running on the server system, or from any other appropriate system. In various embodiments, the maintenance operation comprises nsrim (e.g., a backup software server index management operation), nsrinfo (e.g., a backup software server information retrieval operation), nsrck (e.g., a backup software server integrity check operation), or any other appropriate maintenance operation. In 702, the maintenance operation start time is logged. In some embodiments, logging the maintenance operation start time comprises adding a line to a server system log (e.g., a server system log of server system logs 408 of FIG. 4) comprising the maintenance operation name and the maintenance operation start time. In 704, the maintenance operation is executed. In 706, the maintenance operation completion time is logged. In some embodiments, logging the maintenance operation completion time comprises adding a line to a server system log comprising the maintenance operation name and the maintenance operation completion time. In 708, an indication of the maintenance operation completion is provided (e.g., to the system that provided the indication to start the maintenance operation in 700).

The set of process log entries shown below illustrates an embodiment of process log entries stored in a server system log describing maintenance operation start and stop times.

Figure 8:
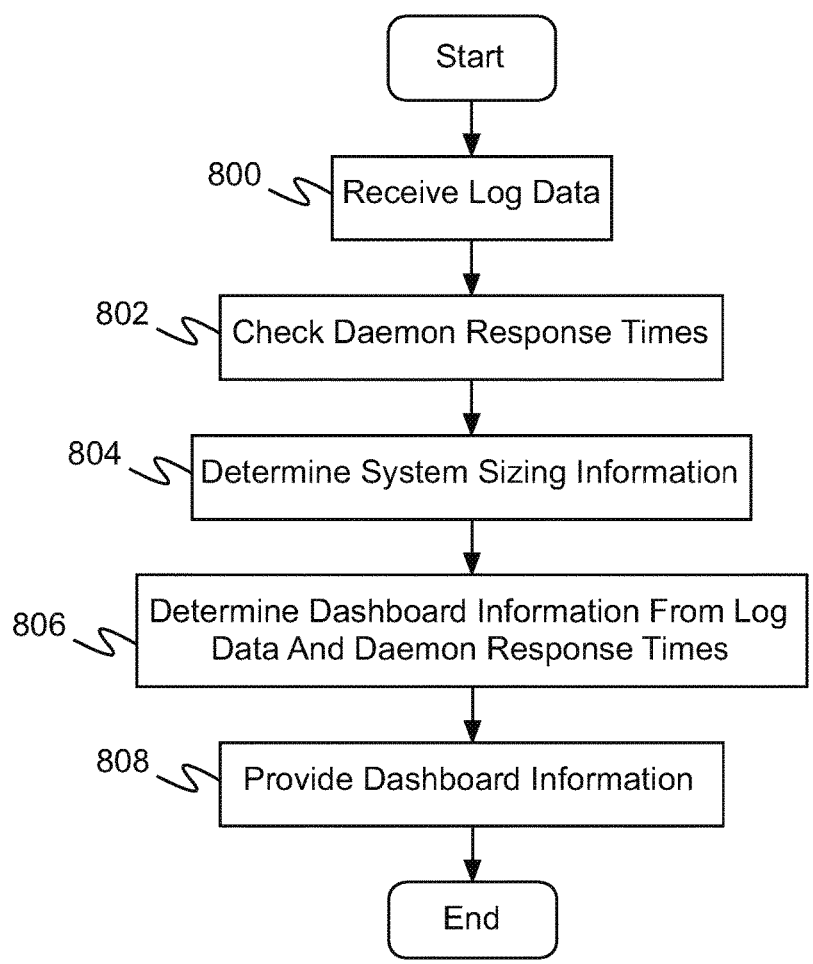
FIG. 8 is a flow diagram illustrating an embodiment of a process for displaying a performance dashboard.

01122013 05:32:22 nsrim process with pid 222 started
01122013 05:33:12 nsrim process with pid 222 ended
01122013 06:44:02 nsrck process with pid 243 started
01122013 06:44:07 nsrck process with pid 243 started
01122013 07:12:34 nsrim process with pid 297 started
01122013 07:12:45 nsrinfo process with pid 299 started
01122013 07:12:52 nsrinfo process with pid 299 ended
01122013 07:13:17 nsrim process with pid 297 ended FIG. 8 is a flow diagram illustrating an embodiment of a process for displaying a performance dashboard. In some embodiments, the process of FIG. 8 is executed by a server system (e.g., server system 104 of FIG. 1). In the example shown, in 800, log data is received. In some embodiments, log data is received from server system logs (e.g., server log system 408 of FIG. 4). In 802, daemon response times are checked. In some embodiments, daemon response times are actively checked by sending a query to a daemon and waiting for a response. In 804, system sizing information is determined. In some embodiments, system sizing information is determined by checking databases and determining system sizing information. In 806, dashboard information is determined from log data and daemon response times. In some embodiments, dashboard information is determined by determining system load information from log data. In some embodiments, dashboard information is determined by formatting data (e.g., into a table, a chart, a graph, etc.). In some embodiments, dashboard information is determined from system sizing information. In 808, dashboard information is provided (e.g., provided for display to a user).

Figure 9:
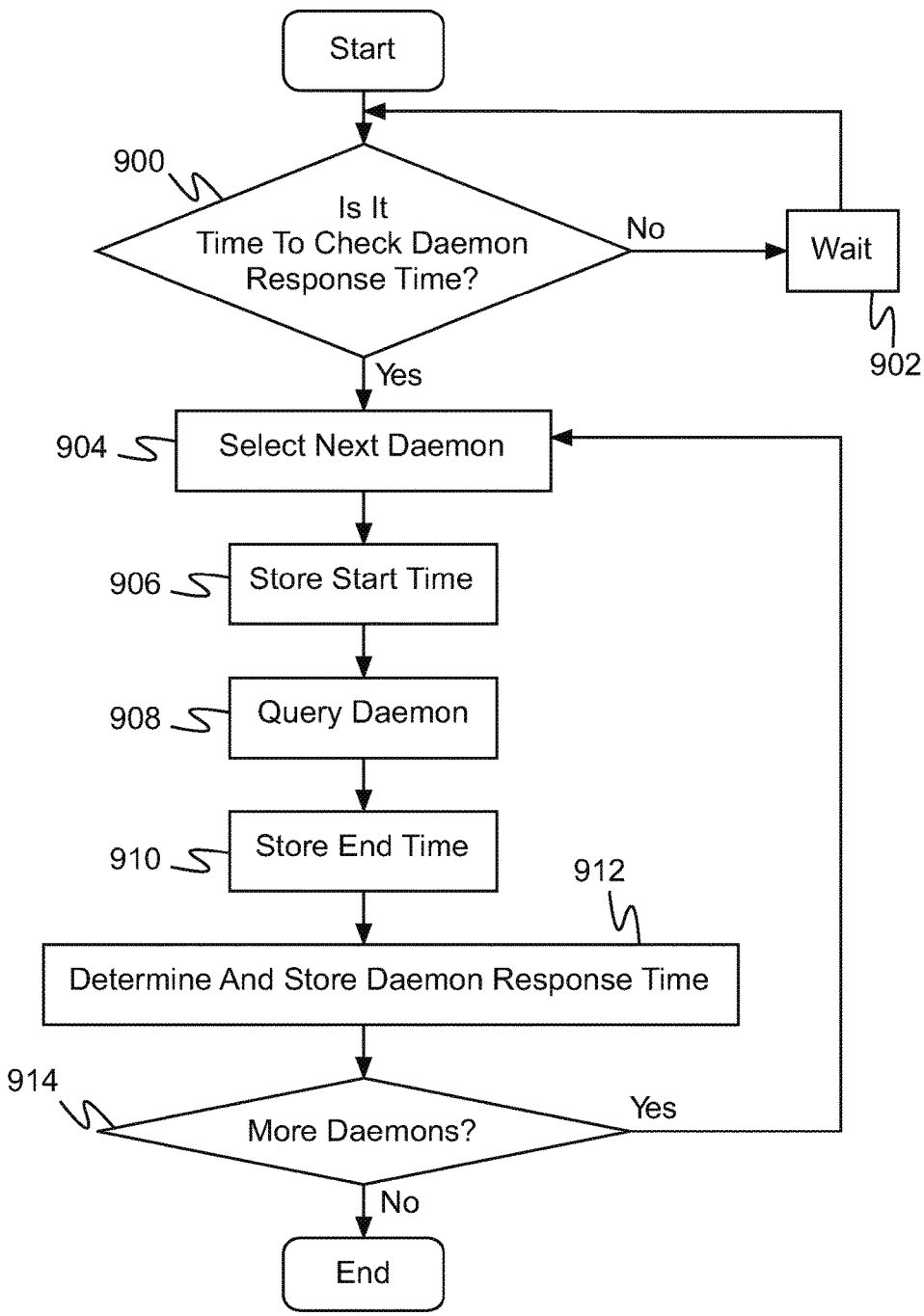
FIG. 9 is a flow diagram illustrating an embodiment of a process for checking daemon response times.

FIG. 9 is a flow diagram illustrating an embodiment of a process for checking daemon response times. In some embodiments, the process of FIG. 9 implements 802 of FIG. 8. In the example shown, in 900, it is determined whether it is time to check the daemon response time. In various embodiments, daemon response times are checked at a predetermined rate (e.g., every 2 minutes, every hour, every day, etc.), on a predetermined schedule (e.g., every day at midnight, noon, and 4 PM), in response to a check daemon response time command (e.g., from a system administrator), in response to a system condition (e.g., daemon response times are checked whenever there is a rise in network traffic, whenever a full backup is requested by a client system, etc.), or at any other appropriate time. If it is determined in 900 that it is not time to check the daemon response time, control passes to 902. In 902, the process waits. In various embodiments, the process waits for 1 millisecond, 500 milliseconds, 4 seconds, 2 minutes, 3 hours, or any other appropriate period of time. Control then passes to 900. If it is determined in 900 that it is time to check the daemon response time, control passes to 904. In 904, the next daemon is selected. In some embodiments, the next daemon comprises the first daemon. In various embodiments, the next daemon comprises nsrd (e.g., a backup software server daemon), nsrexecd (e.g., a backup software client daemon), nsrmmdbd (e.g., a backup software media management daemon), nsrindexd (e.g., a backup software client index management daemon), nsrjobd (e.g., a backup software jobs management daemon), or any other appropriate daemon. In 906, a start time is stored. In 908, the daemon is queried (e.g., a query message is sent to the daemon, and the process waits until a response is received). In 910, the end time is stored. In 912, the daemon response time is determined (e.g., by computing the difference of the end time recorded in 910 and the start time recorded in 906) and stored (e.g., in a daemon response time database). In some embodiments, the daemon response time is stored associated with the time (e.g., the start time) of the query. In 914, it is determined if there are more daemons to query. If it is determined in 914 that there are more daemons to query, control passes to 904. If it is determined in 914 that there are not more daemons to query, the process ends. In some embodiments, the process repeats and control passes to 900.

Figure 10:
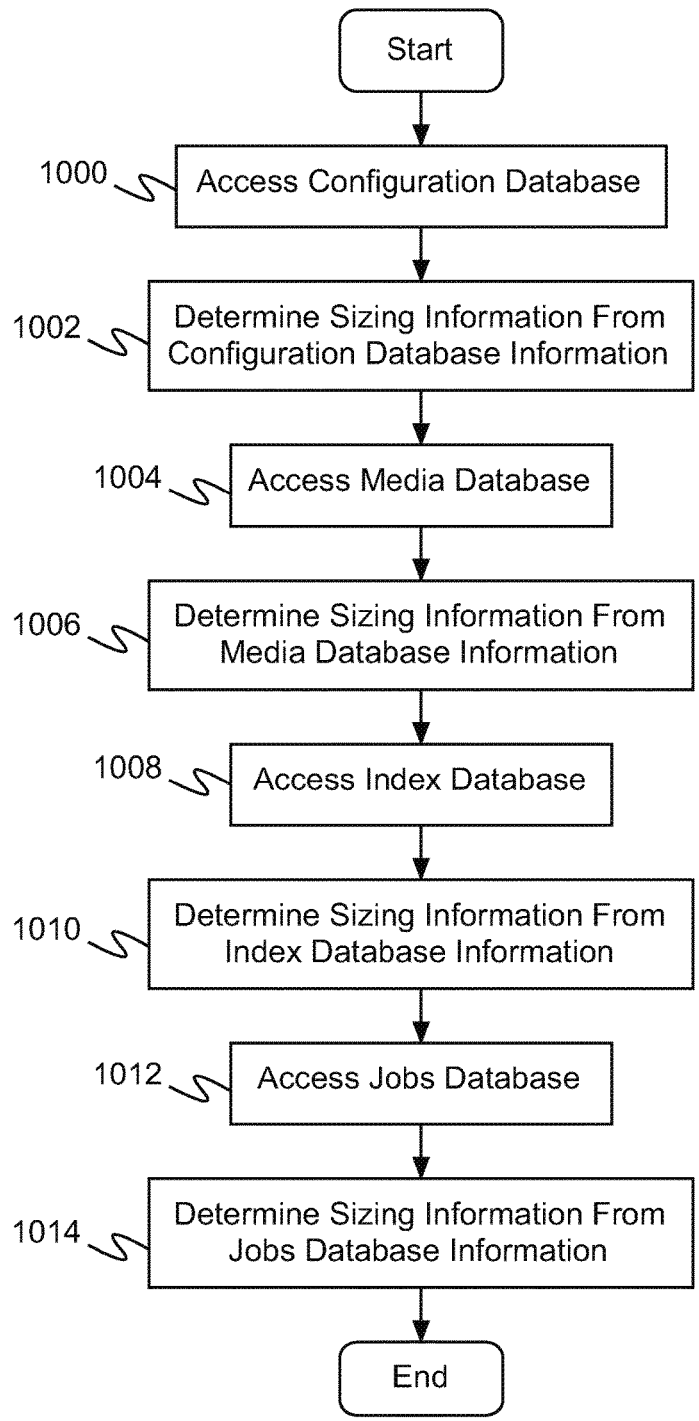
FIG. 10 is a flow diagram illustrating an embodiment of a process for determining system sizing information.

FIG. 10 is a flow diagram illustrating an embodiment of a process for determining system sizing information. In some embodiments, the process of FIG. 10 implements 804 of FIG. 8. In the example shown, in 1000, a configuration database is accessed. In 1002, sizing information is determined from configuration database information. In various embodiments, sizing information determined from configuration database information comprises a configuration database size, a number of clients, a number of unique clients, a number of storage nodes, a number of backup groups, a number of devices, a server parallelism level, an average client parallelism, or any other appropriate sizing information. In 1004, a media database is accessed. In 1006, sizing information is determined from media database information. In various embodiments, sizing information determined from media database information comprises a media database size, a number of saveset records, a number of volume records, or any other appropriate sizing information. In 1008, an index database is accessed. In 1010, sizing information is determined from index database information. In various embodiments, sizing information determined from index database information comprises a number of clients, an index database size, a number of records, or any other appropriate index database information. In 1012, a jobs database is accessed. In 1014, sizing information is determined from jobs database information. In various embodiments, sizing information determined from jobs database information comprises a jobs database size, a number of save jobs, a number of recover jobs, a number of maintenance jobs, or any other appropriate sizing information.

Figure 11:
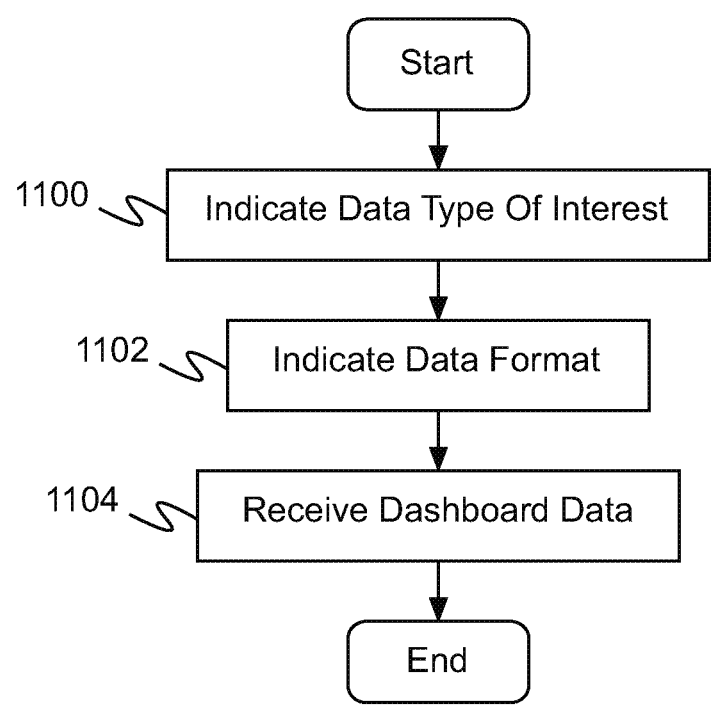
FIG. 11 is a flow diagram illustrating an embodiment of a process for using a performance dashboard.

FIG. 11 is a flow diagram illustrating an embodiment of a process for using a performance dashboard. In some embodiments, the process of FIG. 11 is executed by a system administrator interacting with a server system (e.g., server system 104 of FIG. 1). In the example shown, in 1100, a data type of interest is indicated. In various embodiments, a data type of interest comprises a log data type, a daemon response time data type, a sizing information data type, or any other appropriate data type. In 1102, a data format is indicated. In various embodiments, a data format comprises a table, a chart, a graph, or any other appropriate data type. In 1104, dashboard data is received.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for displaying a performance dashboard comprising:
   an input interface configured to receive log data, wherein the log data comprises a set of process log entries;
   a processor configured to:
   determine whether one or more criteria for checking a daemon response time is satisfied, wherein the one or more criteria include a system condition, wherein the system condition includes one or more of a change in network traffic in relation to a threshold, and an indication that a full backup is requested by at least one client system;
   in response to determining that the one or more criteria for checking the daemon response time is satisfied, determine one or more daemon response times in real time, wherein to determine one or more daemon response times in real time comprises measuring the daemon response time, including querying one or more active processes, wherein the querying of the one or more active processes comprises querying the one or more active processes at a predetermined rate;
   determine dashboard information associated with one or more of the at least one client system and at least one storage system, the at least one client system and the at least one storage system being respectively connected to a network, wherein the dashboard information is based at least in part on the log data and the one or more daemon response times; and
   an output interface configured to provide the dashboard information.

2. The system of claim 1, wherein a process log entry comprises a process name.

3. The system of claim 2, wherein the process name comprises one of the following: nsrim, nsrinfo, or nsrck.

4. The system of claim 1, wherein a process log entry comprises a process identifier.

5. The system of claim 1, wherein a process log entry comprises a process start time.

6. The system of claim 1, wherein a process log entry comprises a process end time.

7. The system of claim 1, wherein each daemon response time of the one or more daemon response times comprises a time between a time a daemon query is sent and a time a daemon response is received.

8. The system of claim 1, wherein determining a daemon response time of the one or more daemon response times comprises:
   sending a query to a daemon;
   determining a start time;
   receiving a response to the query from the daemon;
   determining a stop time; and
   calculating the daemon response time based at least in part on the start time and the stop time.

9. The system of claim 1, wherein one daemon response time of the one or more daemon response times are determined for one of the following: nsrd, nsrexecd, nsrmmdbd, nsrindexd, or nsrjobd.

10. The system of claim 1, wherein the processor is further configured to determine configuration information.

11. The system of claim 10, wherein the configuration information comprises one or more of the following: client system information, client software information, backup storage system information, backup storage software information, backup server system information, and backup server software information.

12. The system of claim 10, wherein the dashboard information is determined based at least in part on the configuration information.

13. The system of claim 1, wherein the processor is further configured to determine system sizing information.

14. The system of claim 13, wherein the system sizing information comprises one or more of the following: configuration database information, media database information, index database information, and jobs database information.

15. The system of claim 13, wherein the dashboard information is determined based at least in part on the system sizing information.

16. The system of claim 1, wherein the log data corresponds to information on a process run on one or more of the at least one client system and the at least one storage system.

17. The system of claim 1, wherein the dashboard information provides an indication of an active process running on one or more of the at least one client system and the at least one storage system and the ability of the active process to respond to an inquiry.

18. The system of claim 1, wherein to determine the one or more daemon response times further comprises measuring an amount of time for the one or more processes to respond to the querying of the one or more active processes.

19. The system of claim 1, wherein the querying of the one or more active processes is performed in response to determining that the one or more criteria for checking the daemon response time is satisfied.

20. A method for displaying a performance dashboard, comprising:
   receiving log data, wherein the log data comprises a set of process log entries;
   determining whether one or more criteria for checking a daemon response time is satisfied, wherein the one or more criteria include a system condition, wherein the system condition includes one or more of a change in network traffic in relation to a threshold, and an indication that a full backup is requested by at least one client system;
   in response to determining that the one or more criteria for checking the daemon response time is satisfied, determining one or more daemon response times using a processor in real time, wherein determining the one or more daemon response times in real time comprises measuring the daemon response time, including querying one or more active processes, wherein the querying of the one or more active processes comprises querying the one or more active processes at a predetermined rate;

determining dashboard information associated with one or more of the at least one client system and at least one storage system, the at least one client system and the at least one storage system being respectively connected to a network, wherein the dashboard information is based at least in part on the log data and the one or more daemon response times; and providing the dashboard information.

21. A computer program product for displaying a performance dashboard, the computer program product being embodied in a non-transitory computer readable storage medium and comprising computer instructions for:

receiving log data, wherein the log data comprises a set of process log entries;

determining whether one or more criteria for checking a daemon response time is satisfied, wherein the one or more criteria include a system condition, wherein the system condition includes one or more of a change in network traffic in relation to a threshold, and an indication that a full backup is requested by at least one client system;

in response to determining that the one or more criteria for checking the daemon response time is satisfied, determining one or more daemon response times in real time, wherein determining the one or more daemon response times in real time comprises measuring the daemon response time, including querying one or more active processes, wherein the querying of the one or more active processes comprises querying the one or more active processes at a predetermined rate;

determining dashboard information associated with one or more of the at least one client system and at least one storage system, the at least one client system and the at least one storage system being respectively connected to a network, wherein the dashboard information is based at least in part on the log data and the one or more daemon response times; and providing the dashboard information.

* * * * *

UNITED STATES PATENT AND TRADEMARK OFFICE
CERTIFICATE OF CORRECTION

PATENT NO. : 10,402,059 B1
APPLICATION NO. : 14/137754
DATED : September 3, 2019
INVENTOR(S) : Kulkarni et al.

Page 1 of 1

It is certified that error appears in the above-identified patent and that said Letters Patent is hereby corrected as shown below:

On the Title Page

Item (56), references cited, other publications, Column 2, Line 1, delete "Sun StorEdge Enterprise Backup Software.TM. 7.2 Administrators Guide. Nov. 2004. Sun Microsystems, Inc., 684 pages." and insert --Sun StorEdge Enterprise Backup Software.TM. 7.2 Administrator's Guide. Nov. 2004. Sun Microsystems, Inc., 684 pages.--, therefor.

Signed and Sealed this
Twenty-third Day of June, 2020

Andrei Iancu
*Director of the United States Patent and Trademark Office*